US011971848B2

(12) United States Patent
Brown et al.

(10) Patent No.: US 11,971,848 B2
(45) Date of Patent: Apr. 30, 2024

(54) EFFICIENT TRANSPARENT SWITCHOVER OF FILE SYSTEM CONSOLIDATION MIGRATIONS

(71) Applicant: Dell Products, L.P., Round Rock, TX (US)

(72) Inventors: Ronald Brown, Fife (GB); John Bankier, Glasgow (GB); Pascal Donette, Magny les Hameaux (FR); Francois Roche, Bailly (FR)

(73) Assignee: DELL PRODUCTS L.P., Round Rock, TX (US)

( * ) Notice: Subject to any disclaimer, the term of this patent is extended or adjusted under 35 U.S.C. 154(b) by 106 days.

(21) Appl. No.: 17/538,363

(22) Filed: Nov. 30, 2021

(65) Prior Publication Data
US 2023/0169033 A1 Jun. 1, 2023

(51) Int. Cl.
*G06F 16/11* (2019.01)
*G06F 16/182* (2019.01)
*H04L 67/06* (2022.01)

(52) U.S. Cl.
CPC .......... *G06F 16/119* (2019.01); *G06F 16/182* (2019.01); *H04L 67/06* (2013.01)

(58) Field of Classification Search
CPC ....... G06F 16/119; G06F 16/182; H04L 67/06
USPC ......................................................... 707/827
See application file for complete search history.

(56) References Cited

U.S. PATENT DOCUMENTS

| 5,991,753 | A | 11/1999 | Wilde | |
|---|---|---|---|---|
| 6,938,039 | B1* | 8/2005 | Bober | G06F 16/119 |
| | | | | 707/827 |
| 7,653,699 | B1* | 1/2010 | Colgrove | G06F 16/10 |
| | | | | 709/215 |
| 7,769,722 | B1 | 8/2010 | Bergant et al. | |
| 7,958,097 | B1* | 6/2011 | Tormasov | G06F 16/1737 |
| | | | | 707/831 |
| 8,601,220 | B1* | 12/2013 | Corbin | G06F 3/0647 |
| | | | | 711/111 |

(Continued)

OTHER PUBLICATIONS

Bankier, et al. "Inode Clash Resolution During File System Migration" U.S. Appl. No. 17/538,387, filed Nov. 30, 2021, 47 pages.

(Continued)

*Primary Examiner* — Hicham Skhoun
(74) *Attorney, Agent, or Firm* — Amin, Turocy & Watson, LLP

(57) ABSTRACT

A system can migrate a source file system on a first computer to a destination file system on a second computer. The system can receive, at the second computer, a request from a client computer that indicates a file system operation, and that references a source file handle of the source file system that comprises an identifier of the source file system. The system can identify the destination file system based on the identifier of the source file system. The system can determine, from a source inode number of the source file handle, a source inode number segment. The system can determine, from the source inode number segment, a destination inode number segment. The system can determine, from the destination inode number segment, a destination inode number. The system can perform the file system operation on the destination file system using the destination inode number and the identifier of the destination file system.

20 Claims, 10 Drawing Sheets

(56) References Cited

U.S. PATENT DOCUMENTS

| | | | |
|---|---|---|---|
| 8,655,848 B1 | 2/2014 | Leverett et al. | |
| 8,671,072 B1* | 3/2014 | Shah | G06F 16/27 |
| | | | 707/610 |
| 9,223,791 B2* | 12/2015 | Whitehouse | G06F 16/134 |
| 9,305,071 B1* | 4/2016 | Bono | G06F 16/119 |
| 9,323,758 B1* | 4/2016 | Stacey | G06F 16/137 |
| 9,639,553 B2* | 5/2017 | Hall | H04L 47/2466 |
| 10,083,181 B2* | 9/2018 | Chun | G06F 3/0631 |
| 10,430,389 B1* | 10/2019 | Gupta | G06F 16/13 |
| 10,552,371 B1* | 2/2020 | Liao | G06F 16/172 |
| 11,533,196 B2 | 12/2022 | Cananzi | |
| 11,546,288 B2 | 1/2023 | Chander et al. | |
| 2003/0158834 A1 | 8/2003 | Sawdon et al. | |
| 2003/0182313 A1 | 9/2003 | Federwisch et al. | |
| 2003/0182322 A1* | 9/2003 | Manley | G06F 16/184 |
| 2003/0182325 A1 | 9/2003 | Manley et al. | |
| 2006/0129513 A1* | 6/2006 | Nakatani | G06F 3/0647 |
| 2007/0038689 A1 | 2/2007 | Shinkai | |
| 2007/0100980 A1* | 5/2007 | Kataoka | H04L 61/5038 |
| | | | 709/223 |
| 2008/0172423 A1 | 7/2008 | Shinkai et al. | |
| 2009/0157690 A1* | 6/2009 | Haswell | G06F 16/119 |
| 2011/0016085 A1* | 1/2011 | Kuo | G06F 16/184 |
| | | | 707/615 |
| 2013/0218847 A1 | 8/2013 | Saika | |
| 2014/0019413 A1* | 1/2014 | Braam | G06F 16/1844 |
| | | | 707/625 |
| 2014/0019425 A1 | 1/2014 | Honami et al. | |
| 2014/0108475 A1* | 4/2014 | Yamada | G06F 16/119 |
| | | | 707/829 |
| 2014/0188953 A1 | 7/2014 | Lin et al. | |
| 2015/0120792 A1* | 4/2015 | Khandelwal | G06F 16/18 |
| | | | 707/825 |
| 2015/0293699 A1* | 10/2015 | Bromley | G06F 3/0649 |
| | | | 711/161 |
| 2016/0055224 A1* | 2/2016 | Shetty | G06F 16/128 |
| | | | 707/624 |
| 2016/0321295 A1 | 11/2016 | Dalton | |
| 2017/0075907 A1 | 3/2017 | Goswami et al. | |
| 2017/0123937 A1 | 5/2017 | Iwasaki et al. | |
| 2017/0139932 A1* | 5/2017 | Hasegawa | G06F 16/122 |
| 2017/0228248 A1 | 8/2017 | Bala et al. | |
| 2018/0189311 A1* | 7/2018 | Newhouse | G06F 21/52 |
| 2021/0089680 A1* | 3/2021 | Gkoulalas-Divanis | |
| | | | G06F 16/122 |
| 2021/0303519 A1* | 9/2021 | Periyagaram | G06F 16/17 |
| 2021/0374099 A1* | 12/2021 | Raju | G06F 16/164 |
| 2022/0332178 A1 | 10/2022 | Brown | |
| 2023/0004535 A1 | 1/2023 | Shaw et al. | |
| 2023/0056217 A1 | 2/2023 | Rathi et al. | |

OTHER PUBLICATIONS

Office Action dated Jan. 19, 2023 for U.S. Appl. No. 17/538,387, 39 pages.

Notice of Allowance dated Jul. 28, 2023 for U.S. Appl. No. 17/538,387, 43 pages.

Notice of Allowance mailed Feb. 22, 2024 for U.S. Appl. No. 17/565,408, 90 pages.

\* cited by examiner

300

```
┌─────────────────────────┐
│       EFFICIENT         │
│     TRANSPARENT         │
│   SWITCHOVER OF FILE    │
│ SYSTEM CONSOLIDATION    │
│       MIGRATIONS        │
│    COMPONENT 310        │
└─────────────────────────┘

┌─────────────────────────┐
│     FILE HANDLE 302     │
│  ┌───────────────────┐  │
│  │ FILE SYSTEM ID 304│  │
│  └───────────────────┘  │
│                         │
│  ┌───────────────────┐  │
│  │ INODE NUMBER 306  │  │
│  └───────────────────┘  │
│                         │
│  ┌───────────────────┐  │
│  │ GENERATION NUMBER │  │
│  │        308        │  │
│  └───────────────────┘  │
└─────────────────────────┘
```

FIG. 3

EFFICIENT TRANSPARENT SWITCHOVER OF FILE SYSTEM CONSOLIDATION MIGRATIONS

BACKGROUND

File system migration can generally comprise transferring a computer file system from a source computer to a destination computer. Where the source computer is a server that provides file system access to a remote client computer, the destination computer can provide that file system access to the remote client computer after a file system migration occurs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can migrate a source file system on a first computer to a destination file system on a second computer. The system can transfer a network address of the first computer to the second computer. The system can receive, at the second computer, a request from a client computer that is directed to the network address, wherein the request indicates a file system operation, wherein the request references a source file handle of the source file system, and wherein the source file handle comprises an identifier of the source file system. The system can determine an identifier of the destination file system based on the identifier of the source file system. The system can determine, from a source inode number of the source file handle and the identifier of the source file system, a source inode number segment. The system can determine, from the source inode number segment, a destination inode number segment. The system can determine, from the destination inode number segment, a destination inode number. The system can perform the file system operation on the destination file system using the destination inode number and the identifier of the destination file system.

An example method can comprise receiving, by a system comprising a processor, a request from a client computer, wherein the request indicates a file system operation, wherein the request references a source file handle of the source file system, wherein the source file handle comprises an identifier of the source file system, and wherein the source file system has been migrated to a destination file system. The method can further comprise determining, by the system, an identifier of the destination file system based on the identifier of the source file system. The method can further comprise determining, by the system and from a source inode number of the source file handle, a source inode number segment. The method can further comprise determining, by the system and from the source inode number segment, a destination inode number segment. The method can further comprise determining, by the system and from the destination inode number segment, a destination inode number. The method can further comprise performing, by the system, the file system operation on the destination file system using the destination inode number and the identifier of the destination file system.

An example non-transitory computer-readable medium can comprise instructions that, in response to execution, cause a system comprising a processor to perform operations. These operations can comprise receiving a request from a client computer, wherein the request indicates a file system operation, wherein the request identifies a first file handle of a first file system, and wherein the first file system is migrated to a second file system. These operations can further comprise determining, from a first inode number of the first file handle, a first inode number segment. These operations can further comprise determining, from the first inode number segment, a second inode number segment. These operations can further comprise determining, from the second inode number segment, a second inode number. These operations can further comprise performing the file system operation on the second file system using the second destination inode number and an identifier of the second file system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates a system architecture of a file handle that can facilitate efficient transparent switchover of file system consolidation migrations, in accordance with an embodiment of this disclosure;

DETAILED DESCRIPTION

Overview

Figure 1:
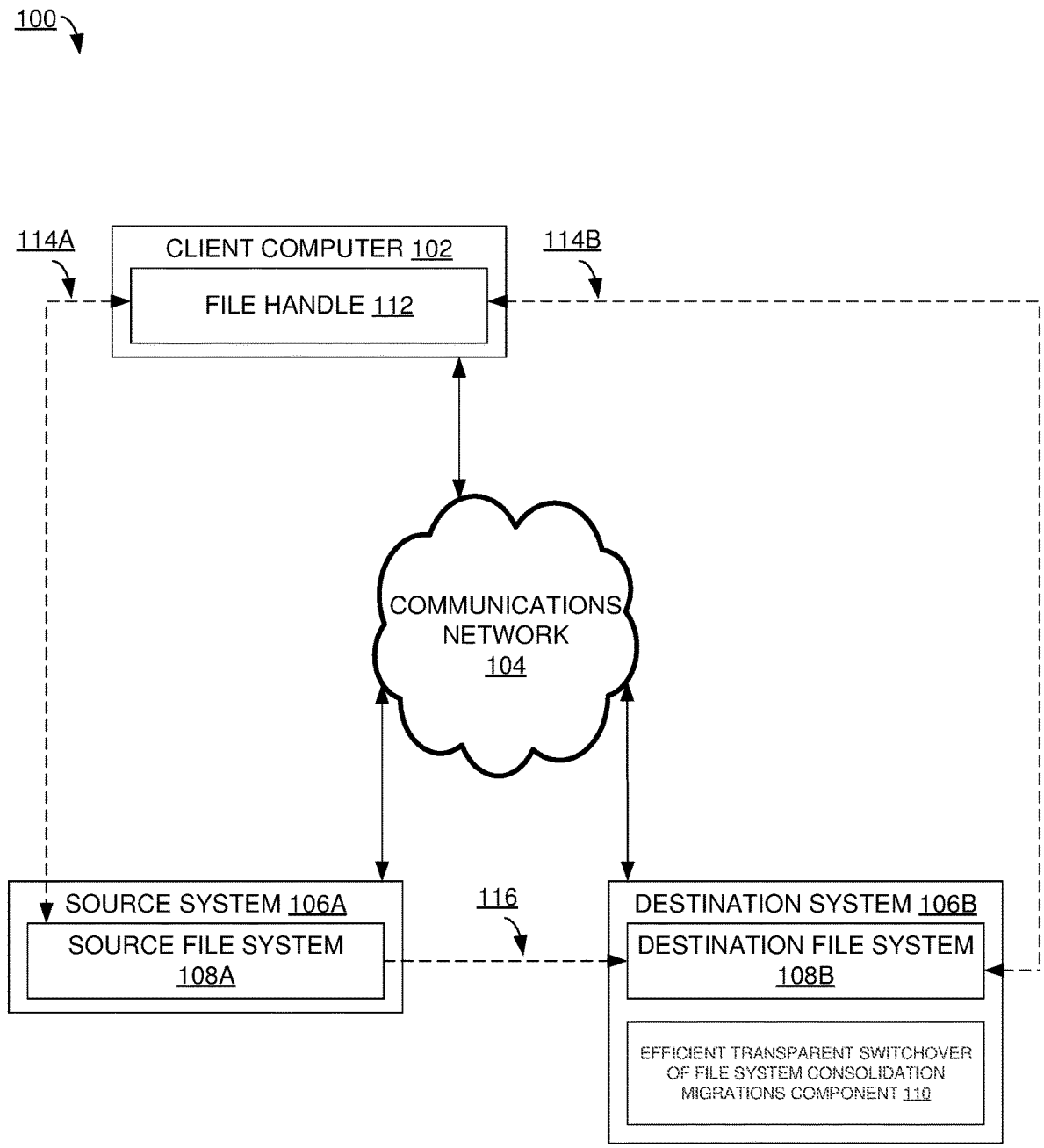
FIG. 1 illustrates an example system architecture that can facilitate efficient transparent switchover of file system consolidation migrations, in accordance with an embodiment of this disclosure.

While the examples described herein primarily relate to a network file system (NFS) file access protocol, it can be appreciated that the present techniques can be applied to other protocols that have suitable characteristics.

Migrating a file system in-band can comprise an approach to consolidating multiple source file systems into a single destination file system. The present techniques can be implemented to provide an inode number management mechanism that facilitates consolidation migrations being performed in a manner that includes an efficient transparent switchover.

Client computers that use a NFS file access protocol to access files and directories within a file system that is stored on a file server can initially navigate to a particular file or directory using name based query requests that return file handle data structures. Once a file handle of a particular file or directory has been discovered, then the client computers can use the file handle for subsequent access of that file or directory.

A NFS protocol can consider file handles to be opaque data structures, though internally a file handle can comprise three components: a file system ID, an inode number, and a generation number.

A transparent switchover can be implemented as follows. When migrating a file system from a source file server to a different, destination file server, it is possible to arrange for client computers using a NFS protocol to continue using existing file handles from the source file server to access the file system on the destination file server after switchover, without disruption or taking additional action by the client computer. In some examples, this can be accomplished as follows:

1. The destination file server can take over a network address of the source file server. NFS protocol requests from client computers containing source file handles can then received on the destination file server.
2. The destination file server can use a file system ID component of the source file handle to determine which destination file system is being referred to.
3. The destination file server can use the source inode number to look up the equivalent entity (e.g., a corresponding file or directory) in the destination file system and the generation number to verify that it is the same version as expected.

An inode mapping table can be implemented as follows. According to some prior approaches, a mapping table can be used to map a combination of inode number and generation number from a source file system to an inode number and generation number of an equivalent entity on a destination file system (and vice versa).

Where one entity can be required per file system entity, each mapping table can be prohibitively large. Additionally, it can be difficult to manage, where a large mapping cable is able to be deleted only once clients are no longer using source file handles.

Inode preservation can be implemented as follows. Some in-band migration products can be implemented without a requirement for a mapping table, where in-band migration can preserve an inode number and generation number of an entity when migrating it. This approach can be referred to as "inode preservation."

However, inode preservation can have a problem where it can not be possible to consolidate multiple file systems from different source file servers into a single destination file system because of a possibilty that more than one source file can contain the same inode number.

The present techniques can facilitate an inode number mapping mechanism that allows a consolidation of multiple source file systems into a single destination file system without an expense of a per inode number mapping table. This consolidation can be performed in series (where a single source file system is migrated at a time) or in parallel (where all source file systems are migrated at the same time).

According to the present techniques, the source file system and destination file system inode spaces are split into one or more segments, and source file system inode number segments can be deterministically mapped to destination file system inode number segments (and vice versa). In some examples, the segments can be of a varying size, and a mapping from source to destination can be 1:1, 1:n, or n:1. This approach can facilitate source file handles being returned to clients for each source file system of a consolidation migration.

Allocating inode number segments for a new source file system can be implemented as follows. When migrating a new source file system inode numbers within that file system can be analyzed and associated with one or more source inode number segments.

In some examples, depending on whether a source file system is read only, an allowance can be made for allocating additional source inode numbers when an initial source inode number segments are determined.

In some examples, each source inode number segment can be associated with one or more destination inode number segments.

A component can be associated with each source inode number segment to translate each source inode number within a segment to a corresponding destination inode number within a destination file system. A purpose of this component can be to ensure that each source inode number results in a unique destination inode number. In some examples, this component can comprise adding a numeric offset on the source inode number, subtracting a numeric offset on the source inode number, performing a bitwise shift on part of the source inode number, or otherwise converting the source inode number to a corresponding destination inode number.

A similar component can be associated with each destination inode number segment to translate each destination inode number within a segment to a corresponding source inode number within the source file system.

In some examples, a system that implements the present techniques can have the following characteristics. A destination file system can provide a capability to allocate an entity with a specific inode number and a specific generation number. Inode number allocation on source and destination file systems can be clustered, which can facilitate using reasonably sized segments.

In some examples, "reasonably sized" can be specific to an implementation, and can be used to address a problem of fragmentation by using relatively large numbers of relatively small segments. For example, where inode number segments each span 10% of an inode number space, then it could be that at most 10 file systems could be consolidated in a migration (where each source file system has at least one corresponding inode number segment). Then, there can be increased overhead involved with managing a relatively large number of small inode number segments and traversing them. In an example where a file system provisions space in chunks (sometimes referred to as slices), a "reasonable size" for an inode number segment can be a number of inodes that fit within one chunk.

Allocating inode number segments can be implemented as follows. In some examples, if at a point during migration, allocation of a new inode number on either the source file system or the destination file system would exceed a capacity of existing source inode number segments or destination inode number segments, new segments can be allocated on-demand.

Inode number segments can be allocated as follows. In some examples, source inode number segments and associated destination inode number segments can be allocated in certain circumstances.

Before copying data for a given source file system, source inode number segments and associated destination inode number segments can be allocated by allocating inode numbers in use within that source file system, as well as existing destination inode number segments created by migration of other source file systems to the same destination file system. There can be examples where source inode number segments and associated destination inode number segments are allocated after beginning to copy data for a given source file system. In some examples, allocating source inode number segments and associated destination inode number segments before copying data, can lead to less latency in processing intercepted client create requests where source inode number segments are over provisioned to provide for some space for client computers creating new entities.

Source inode number segments and associated destination inode number segments can be allocated on demand where a migration engine copies each new entity (e.g., a directory, a file, an alternate data stream, etc.) from an source file system to a destination file system and discovers that there is no space in an existing source inode number segment or associated destination inode number segment for the source inode number and/or mapped destination inode number.

In such examples, a client computer can attempt to create a new entity after migration has switched over to a destination file server, and there can be no space in an existing source inode number segment or associated destination inode number segment for the source inode number and/or mapped destination inode number of the new entity.

In creating a new entity by a client computer after switchover, even where a client computer is connected to a destination file system, a "syncer" component of an in-band migration product can intercept modification requests (including creations), and apply them to a source file system first, and then apply them to the destination file system where the request succeeds on the source file system. In some migration example that support a transparent rollback, the in-band migration "syncer" component can provide for transparent rollback to a source file system if a migration fails or is cancelled be ensuring that a source file system is up to date with changes made by clients.

A migration engine case for allocating inode number segments can be implemented as follows. When the migration engine copies a new entity from a source file system to a destination file system, the migration engine can use a source inode number of the entity and attempt to find an existing source inode number segment in which that number will fit. Where a suitable existing source inode number segment is not found, one or more new source inode number segments and associated destination inode number segments can be created. The migration engine can create the new entity on the destination file system using a mapped destination inode number that is defined by the destination inode number segment associated with the source inode number segment.

A "syncer" case for allocating inode number segments where transparent rollback of a migration is allowed for can be implemented as follows. When a client computer attempts to create a new entity after switchover, an in-band migration syncer can intercept a creation request and attempt to apply it first to a source file system. Where a create request is successful on the source file system, the syncer can have a source inode number of the new entity. The syncer can use the source inode number of the new entity, and attempt to find an existing source inode number segment in which the source inode number fits. Where a suitable existing source inode number segment is not found, one or more new source inode number segments and associated destination inode number segments can be created. The syncer can create the new entity on the destination file system using a mapped destination inode number defined by a destination inode number segment that is associated with the source inode number segment.

In some migration examples that do not provide for transparent rollback, it can be that file system modification operations, including creates, are applied to the destination file system but not the source file system (since it can be that the source file system is not kept in sync with the destination file system since there will not be a migration rollback to the source file system).

In such examples, it can be that allocation of new inode numbers for creates is performed from a "destination only" inode number segment that does not have a mapping to a corresponding source inode number segment, and a destination file handle can be returned to a client computer for the create operation.

A reason for using destination inode number segments in this example where there is not an option of transparent rollback can be to provide for future consolidation migrations from other source file systems to the destination file system. In contrast, were inode numbers randomly allocated from a remaining available inode number space on the destination file system, there could be a situation where the destination inode number space is fragmented, and there is not a sufficient contiguous range of destination inode numbers to allow for creating a new destination inode number segment as part of a future migration.

Example Architectures

FIG. 1 illustrates an example system architecture 100 that can facilitate efficient transparent switchover of file system consolidation migrations, in accordance with an embodiment of this disclosure.

As depicted, system architecture 100 comprises client computer 102, communications network 104, source system 106A, and destination system 106B. In turn, client computer 102 comprises file handle 112; source system 106A comprises source file system 108A; and destination system 106B comprises destination file system 108B, and efficient transparent switchover of file system consolidation migrations component 110.

Source system 106A can provide client computer 102 with access to source file system 108A, via communications network 104. This access can comprise reading, writing, and creating files on source file system 108A. In the course of accessing source file system 108A, client computer 102 can utilize file handle 112, which is a file handle that identifies a specific file in source file system 108A, and which can be a file handle that was generated by source system 106A. Client computer 102 can utilize file handle 112 to access source file system 108A as part of communication 114A.

Later, a file system migration can occur, where source file system 108A is migrated to destination system 106B as destination file system 108B (illustrated by communication 116). Part of this migration can involve changing a network routing of source system 106A and destination system 106B, such that a network address (e.g., an Internet Protocol (IP) address) or a domain name (e.g., according to a Domain Name System (DNS)) that identified source system 106A prior to the migration now identifies destination system 106B after the migration. This changing can sometimes be referred to as a switchover.

Efficient transparent switchover of file system consolidation migrations component 110 can facilitate making this switchover transparent to client computer 102. A way that efficient transparent switchover of file system consolidation migrations component 110 can do this is by facilitating client computer 102 using the same file handle 112 that was issued by source system 106A on destination system 106B. This communication by client computer 102 using file handle 112 to access destination file system 108B is illustrated by communication 114B.

Figure 10:
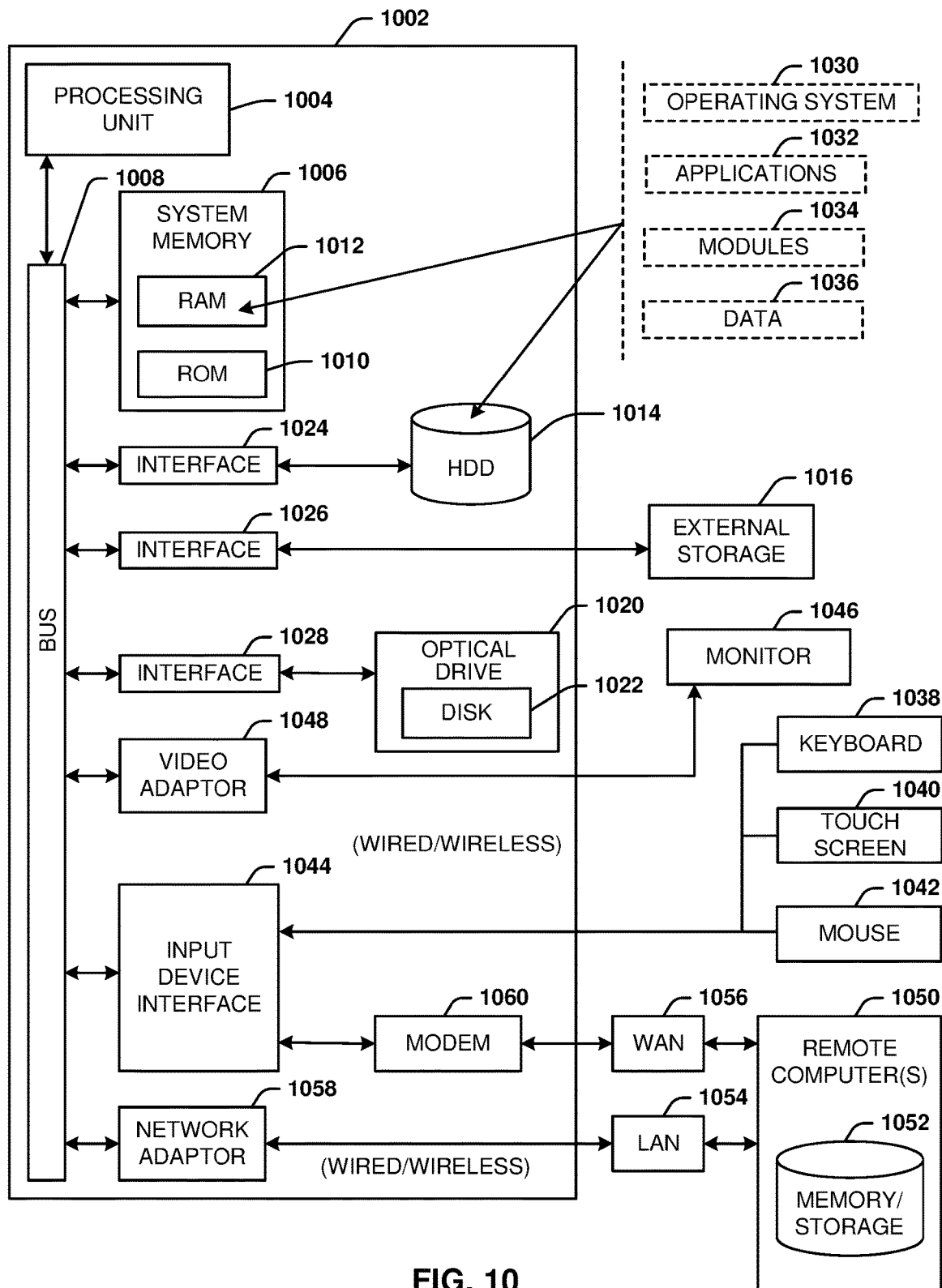
FIG. 10 illustrates an example block diagram of a computer operable to execute an embodiment of this disclosure.

Each of client computer 102, source system 106A, and/or destination system 106B can be implemented with part(s) of computing environment 1000 of FIG. 10. Communications network 104 can comprise a computer communications network, such as the INTERNET.

In some examples, efficient transparent switchover of file system consolidation migrations component 110 can implement part(s) of the process flows of FIGS. 6-9 to facilitate efficient transparent switchover of file system consolidation migrations.

It can be appreciated that system architecture 100 is one example system architecture for efficient transparent switchover of file system consolidation migrations, and that there can be other system architectures that facilitate efficient transparent switchover of file system consolidation migrations.

Figure 2:
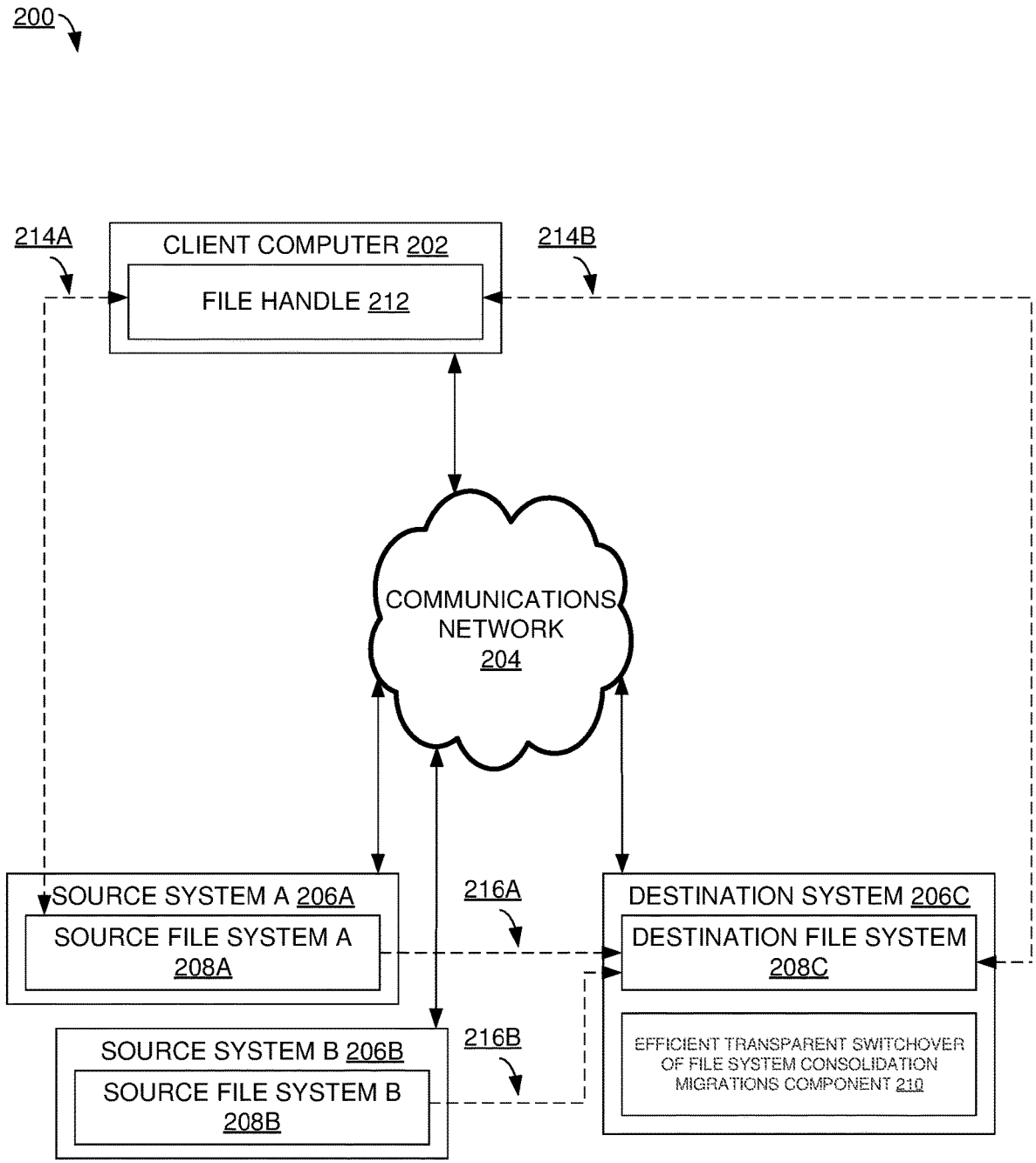
FIG. 2 illustrates another example system architecture of multiple migrated file systems, and that can facilitate efficient transparent switchover of file system consolidation migrations, in accordance with an embodiment of this disclosure.

FIG. 2 illustrates another example system architecture 200 of multiple migrated file systems, and that can facilitate efficient transparent switchover of file system consolidation migrations, in accordance with an embodiment of this disclosure.

As depicted, system architecture 200 comprises client computer 202 (which can be similar to client computer 102 of FIG. 1), communications network 204 (which can be similar to communications network 104), source system 206A (which can be similar to source system 106A), source system 206B (which can be similar to another instance of source system 106A), and destination system 206C (which can be similar to destination system 106B). In turn, client computer 202 comprises file handle 212 (which can be similar to file handle 112); source system 206A comprises source file system 208A (which can be similar to source file system 108A); source system 206B comprises source file system 208B (which can be similar to another instance of source file system 108A); and destination system 206C comprises destination file system 208C (which can be similar to destination file system 108B), and efficient transparent switchover of file system consolidation migrations component 210 (which can be similar to efficient transparent switchover of file system consolidation migrations component 110).

Client computer 202 can utilize file handle 212 to access source file system A 208A before a migration (as illustrated by communication 214A), and can utilize file handle 212 to access destination file system 208C after a migration (as illustrated by communication 214B). As depicted, destination file system 208C comprises a migration of multiple file systems—a migration of source file system A 208A (as illustrated by communication 216A), and a migration of source file system B 208B (as illustrated by communication 216B).

Similar to the example of system architecture 100 of FIG. 1, where destination file system 208C comprises a migration of multiple file systems, efficient transparent switchover of file system consolidation migrations component 210 can facilitate transparent file handle usage at destination file system 208C of file handles originated by each of those multiple source file systems.

FIG. 3 illustrates a system architecture 300 of a file handle that can facilitate efficient transparent switchover of file system consolidation migrations, in accordance with an embodiment of this disclosure.

As depicted, system architecture 300 comprises file handle 302 (which can be similar to file handle 112 of FIG. 1, and/or file handle 212 of FIG. 2), and efficient transparent switchover of file system consolidation migrations component 310 (which can be similar to efficient transparent switchover of file system consolidation migrations component 110 of FIG. 1, and/or efficient transparent switchover of file system consolidation migrations component 210 of FIG. 2).

In turn, file handle 302 comprises file system ID 304, inode number 306, and generation number 308. File system ID 304 can identify a file system that file handle 302 is used with (e.g., source file system 108A of FIG. 1). Inode number 306 identifies an inode within the file system in which the file identified by file handle 302 is stored. Generation number 308 identifies a generation number, where a file system can generate different inode numbers at different times for an object stored in the file system. In some examples, a file system can reuse an inode number that corresponded to an entity that has since been deleted. When an inode number is reused, the generation number can be different, and these different generation numbers can be used to differentiate between the old, deleted entity, and the new entity.

In effectuating efficient transparent switchover of file system consolidation, efficient transparent switchover of file system consolidation migrations component 110 of FIG. 1 can modify information stored in file handle 302, such as translating a file system ID to a file system ID where the file system was migrated to, and adjusting an inode number by an offset value to identify an inode number in the destination file system.

Figure 4:
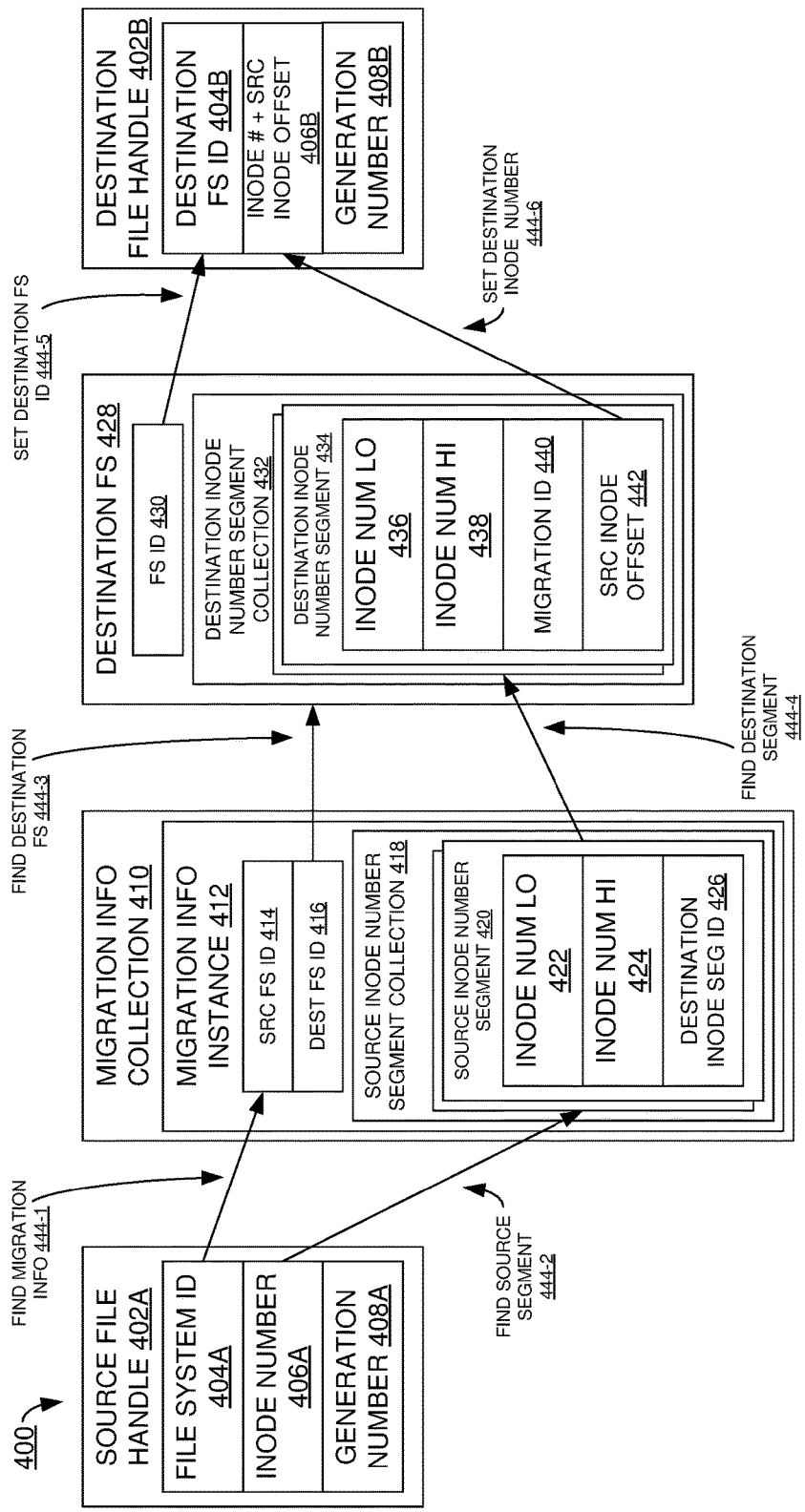
FIG. 4 illustrates an example system architecture for using existing source file handles on a destination after switchover, and that can facilitate efficient transparent switchover of file system consolidation migrations, in accordance with an embodiment of this disclosure.

FIG. 4 illustrates an example system architecture 400 for using existing source file handles on a destination after switchover, and that can facilitate efficient transparent switchover of file system consolidation migrations, in accordance with an embodiment of this disclosure.

As depicted, system architecture 400 comprises source file handle 402A, migration info collection 410, destination file system 428, and destination file handle 402B. Source file handle 402A can be similar to file handle 302 of FIG. 3, with file system ID 404A being similar to file system ID 304, inode number 406A being similar to inode number 306, and generation number 408A being similar to generation number 308. Similarly, destination file handle 402B can be similar to file handle 302, with destination file system ID 404B being similar to file system ID 304, inode number+source inode offset 406B being similar to inode number 306, and generation number 408B being similar to generation number 308.

In some examples, source file handle 402A can be a file handle used by client computer 102 with source system 106A. Where source file system 108A is migrated to destination file system 108B, client computer 102 can still use source file handle 402A, and efficient transparent switchover of file system consolidation migrations component 110 can translate source file handle 402A into destination file handle 402B, which can be used on the destination file system. This can be accomplished by efficient transparent switchover of file system consolidation migrations component 110 utilizing migration info collection 410 and destination file system 428.

Migration info collection 410 comprises migration info instance 412. In the example of FIG. 4, there is one migration info instance because there is one migrated file system. There can be examples where there are multiple migrated file systems, and where a migration info collection comprises multiple migration info instances, like in FIG. 5. Migration info instance 412 comprises source file system ID 414 and destination file system ID 416. Source file system ID 414 and destination file system ID 416 can be used to translate between a source file system and a destination file system. Migration info instance 412 also comprises source inode number segment collection 418, which can comprise a group of source inode number segments, which includes source inode number segment 420.

Each source inode number segment of source inode number segment collection 418 can identify a range of source inode numbers covered by that source inode number segment (here, the range in source inode number segment 420 is bounded by inode num lo 422 and inode num hi 424). Each source inode number segment of source inode number segment collection 418 can also comprise a destination inode segment ID 426, which identifies a destination inode number segment of destination file system 428.

Destination file system 428 comprises file system ID 430 and destination inode number segment collection 432. Destination inode number segment collection 432 comprises destination inode number segment 434. Similar to source inode number segment collection 418, each destination inode number segment of destination inode number segment collection 432 can comprise a range of inode numbers (which, for destination inode number segment 434 can be bounded by inode num lo 436 and inode num hi 438, a migration identifier (e.g., migration ID 440), and a source inode offset (e.g., source inode offset 442). A migration identifier can identify a particular migration that the destination inode number segment relates to, and a source inode offset can identify a numerical value to add to a source inode number to determine a destination inode number (e.g., to translate inode number 406A to inode number+source inode offset 406B).

The following communications can occur to translate source file handle 402A into destination file handle 402B, so that a client can continue to use a source file handle on a destination file system after migration. File system ID 404A can be used to find migration info 444-1, where a source file system ID (e.g., source file system ID 414) is found within a migration info instance (e.g., migration info instance 412) to identify the proper migration info instance. Inode number 406A can be used with the identified migration info instance to identify the corresponding source inode number segment (here, the corresponding source inode number segment of source inode number segment collection 418).

From source file system ID 414, destination file system ID 416 can be identified, and used to find destination file system 444-3 (here, destination file system 428). From the identified source inode number segment of source inode number segment collection 418, find destination segment 444-4 can be performed to identify the corresponding destination inode number segment of destination inode number segment collection 418 within the identified destination file system.

File system ID 430 of the destination file system can be used to set destination file system ID 444-5 for destination file system ID 404B. Source inode offset 442 of the identified destination inode number segment can be used to set destination inode number 444-6, where inode number+source inode offset 406B can be a sum of inode number 406A and source inode offset 442. Generation number 408A can be used as generation number 408B.

Having created destination file handle 402B from source file handle 402A in this manner, destination file handle 402B can then be used to perform a file system operation identified by the client computer using source file handle 402A. In some examples, rather than creating a file handle (e.g., destination file handle 402B), component information that could be used to create a file handle (e.g., destination file system ID 404B, inode number+source inode offset 406B, and generation number 408B) can be used to perform the file system operation.

This example of system architecture 400 (and the example of system architecture 500 of FIG. 5) can involve a 1:1 mapping between source inode number segments (e.g., source inode number segment 420) and destination inode number segments (e.g., destination inode number segment 434), where segment sizes are defined using inode number ranges (e.g., inode num lo 422 and inode num hi 424), and an offset (e.g., source inode offset 442) is used to translate source inode numbers to destination inode numbers.

Using existing source file handles on the destination after switchover can be performed as follows:

1. The file system ID from the source file handle can be used to find a migration info instance. This can be communication 444-1.
2. An inode number from the source file handle can be used to find a source inode number segment in the migration info instance by looking for a segment where inode num lo<=inode number<=inode num hi (e.g., the range of inode numbers in the segment includes the inode number of the source file handle). This can be communication 444-2.
3. The destination file system ID from the migration info instance can be used to find the destination file system. This can be communication 444-3.
4. The destination inode segment ID from the source inode number segment can be used to find the destination inode number segment in the destination file system. This can be communication 444-4.
5. The destination file system ID from the destination file system (or migration info instance) can be used to set the file system ID in the destination file handle. This can be communication 444-5.
6. The source inode offset in the destination inode number segment can be used to determine the destination inode number by adding the offset to the source inode number. This can be communication 444-6.

In some examples, inode numbers are mapped, and generation numbers are not mapped. That is, generation numbers used in resulting destination file handles (e.g., generation number 408B) can be the same as in the source file handles (e.g., generation number 408A).

Where multiple migration source file systems have entities with clashing inode numbers, a source file system ID in a source file handle can be used to match a correct migration info instance, and used for the client to access the correct source inode number segment. In some architectures, a source file system ID can be an export file system ID, which can be a globally unique identifier (GUID), so can be globally unique.

In some architectures, a source file system ID can be an integer which might not be globally unique. However, the network address that the client computer is connected to after switchover can be the original network address of the source file server, so the network address can be added to the migration info instance, and matched when determining which migration info instance to use for a source file handle.

Figure 5:
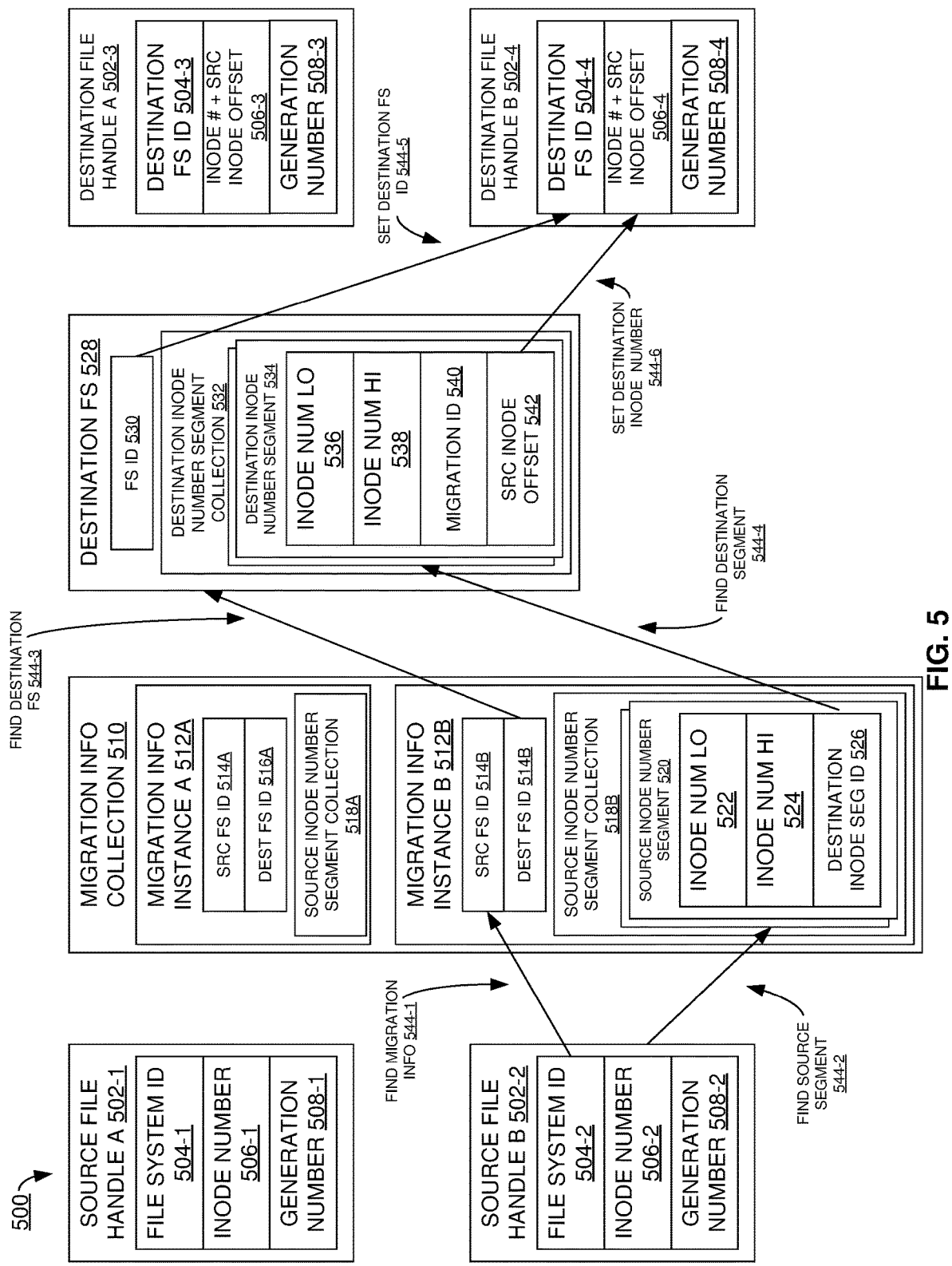
FIG. 5 illustrates an example system architecture for using existing source file handles on a destination after switchover with multiple migrated file systems, and that can facilitate efficient transparent switchover of file system consolidation migrations, in accordance with an embodiment of this disclosure.

FIG. 5 illustrates an example system architecture 500 for using existing source file handles on a destination after switchover with multiple migrated file systems, and that can facilitate efficient transparent switchover of file system consolidation migrations, in accordance with an embodiment of this disclosure.

System architecture 500 can be similar to system architecture 400 of FIG. 4, where multiple source file systems have been migrated to one destination file system, compared to one source file system being migrated in system architecture 400.

System architecture 500 comprises source file handle A 502-1, source file handle B 502-2, migration info collection 510, destination file system 528, destination file handle A 502-3, and destination file handle B 502-4.

Source file handle A 502-1 and source file handle B 502-2 can each be similar to an instance of source file handle 402A of FIG. 4 (where the two file handles are originated by different file systems). Likewise, each of file system ID 504-1 and file system ID 504-2 can be similar to file system ID 404A; each of inode number 506-1 and inode number 506-2 can be similar to inode number 406A; and each of generation number 508-1 and generation number 508-2 can be similar to generation number 408A.

Destination file handle A 502-3 and destination file handle B 502-4 can each be similar to an instance of destination file handle 402B of FIG. 4, where destination file handle A 502-3 corresponds to source file handle A 502-1, and destination file handle A 502-4 corresponds to source file handle A 502-2. Likewise, each of destination file system ID 504-3 and destination file system ID 504-3 can be similar to destination file system ID 404B; each of inode number+source inode offset 506-3 and inode number+source inode offset 506-4 can be similar to inode number+source inode offset 406B; and each of generation number 508-3 and generation number 508-4 can be similar to generation number 408B.

Migration info collection 510 can be similar to migration info collection 410, where migration info collection 510 comprises multiple migration info instances instead of one. Migration info instance A 512A can correspond to source file handle A 502-1 and migration info instance B 512B can correspond to source file handle B 502-2. Each of source file system ID 514A and source file system ID 514B can be similar to source file system ID 414; each of destination file system ID 516A and destination file system ID 516B can be similar to destination file system ID 416; and each of source inode number segment collection 518A and source inode number segment collection 518B can be similar to source inode number segment collection 418.

Within source inode number segment collection 518B, source inode number segment 520 can be similar to source inode number segment 420; inode num lo 522 can be similar to inode num lo 422; inode num hi 524 can be similar to inode num hi 424; and destination inode segment ID 526 can be similar to destination inode segment ID 426.

Destination file system 528 can be similar to destination file system 428. Within destination file system 528, file system ID 530 can be similar to file system ID 430, destination inode number segment collection 532 can be similar to destination inode number segment collection 432; destination inode number segment 534 can be similar to destination inode number segment 434; inode num lo 536 can be similar to inode num lo 436; inode num hi 538 can be similar to inode num hi 438; migration ID 540 can be similar to migration ID 440; and source inode offset 542 can be similar to source inode offset 442.

Efficient transparent switchover of file system consolidation migrations component 110 can translate source file handle 502-1 into destination file handle 502-3, which can be used on the destination file system, and can translate source file handle 502-2 into destination file handle 502-4, which also can be used on the destination file system. This can be accomplished by efficient transparent switchover of file system consolidation migrations component 110 utilizing migration info collection 510 and destination file system 528.

The communications for translating source file handle B 502-2 to destination file handle B 502-4 can be similar to the communications of FIG. 4. In general, when using multiple migrated file systems, each migrated file system can have its own migration info instance within migration info collection 510, which using the same information within destination file system 528.

That is, communication 544-1 can be similar to communication 444-1; communication 544-2 can be similar to communication 444-2; communication 544-3 can be similar to communication 444-3; communication 544-4 can be similar to communication 444-4; communication 544-5 can be similar to communication 444-5; and communication 544-6 can be similar to communication 444-6. In these communications of FIG. 5, migration info instance B 512B can be utilized, where migration info instance 512A can correspond to migration info instance 412 (e.g., migration info instance A 512A is used with source file handle A 502-1, while migration info instance B 512B is used with source file handle B 502-2).

Example Process Flows

Figure 6:
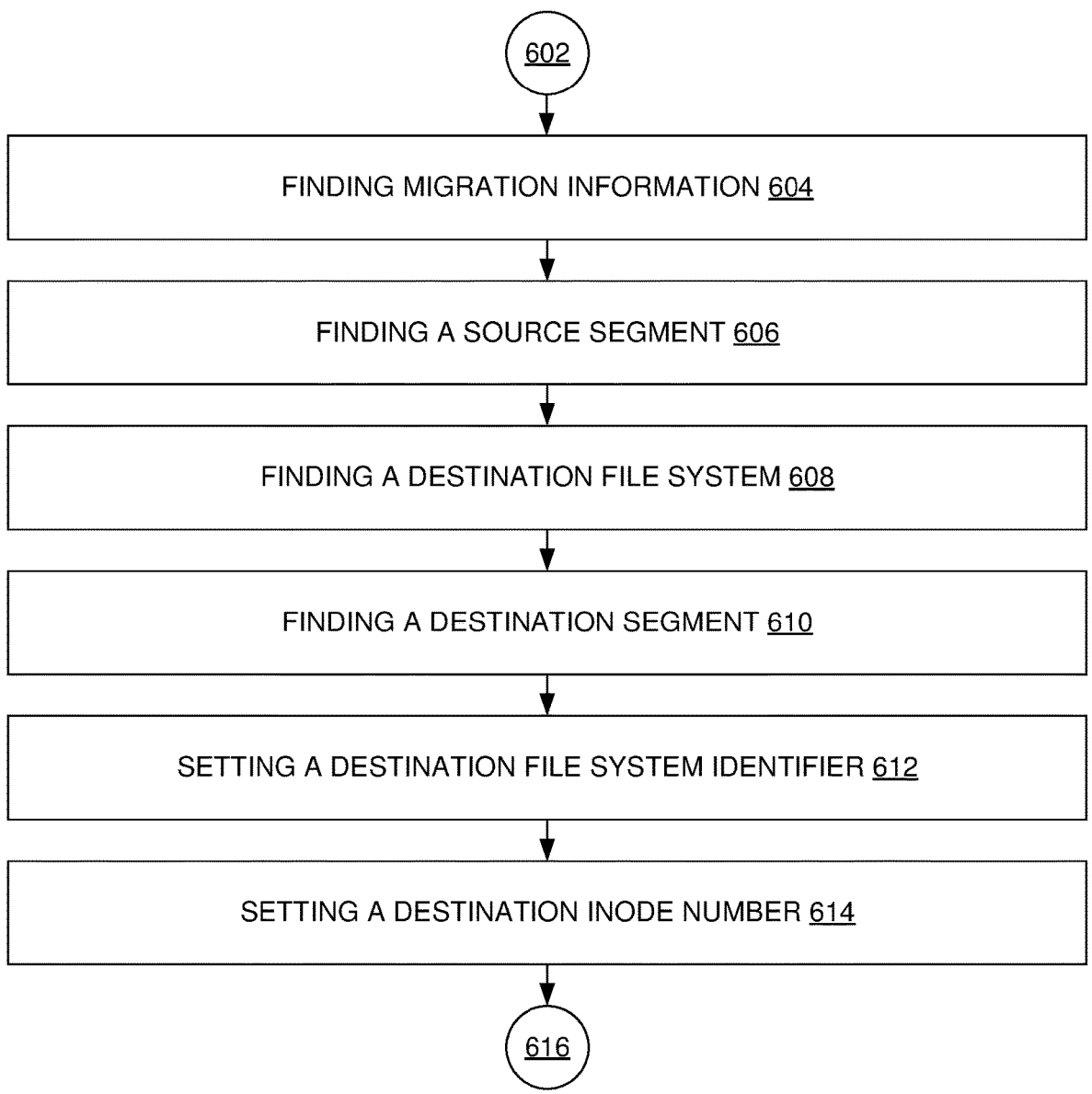
FIG. 6 illustrates an example process flow that can facilitate efficient transparent switchover of file system consolidation migrations, in accordance with an embodiment of this disclosure.

FIG. 6 illustrates an example process flow 600 that can facilitate efficient transparent switchover of file system consolidation migrations, in accordance with an embodiment of this disclosure. In some examples, one or more embodiments of process flow 600 can be implemented by efficient transparent switchover of file system consolidation migrations component 110 of FIG. 1, efficient transparent switchover of file system consolidation migrations component 210 of FIG. 2, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

Process flow 600 begins with 602, and moves to operation 604. Operation 604 depicts finding migration information. This can be implemented in a manner similar to communication 444-1 of FIG. 4, or 544-1 of FIG. 5.

After operation 604, process flow 600 moves to operation 606.

Operation 606 depicts finding a source segment. This can be implemented in a manner similar to communication 444-2 of FIG. 4, or 544-2 of FIG. 5.

After operation 606, process flow 600 moves to operation 608.

Operation 608 depicts finding a destination file system. This can be implemented in a manner similar to communication 444-3 of FIG. 4, or 544-3 of FIG. 5.

After operation 608, process flow 600 moves to operation 610.

Operation 610 depicts finding a destination segment. This can be implemented in a manner similar to communication 444-4 of FIG. 4, or 544-4 of FIG. 5.

After operation 610, process flow 600 moves to operation 612.

Operation 612 depicts setting a destination file system identifier. This can be implemented in a manner similar to communication 444-5 of FIG. 4, or 544-5 of FIG. 5.

After operation 612, process flow 600 moves to operation 614.

Operation 614 depicts setting a destination inode number. This can be implemented in a manner similar to communication 444-6 of FIG. 4, or 544-6 of FIG. 5.

After operation 614, process flow 600 moves to 616, where process flow 600 ends.

Figure 7:
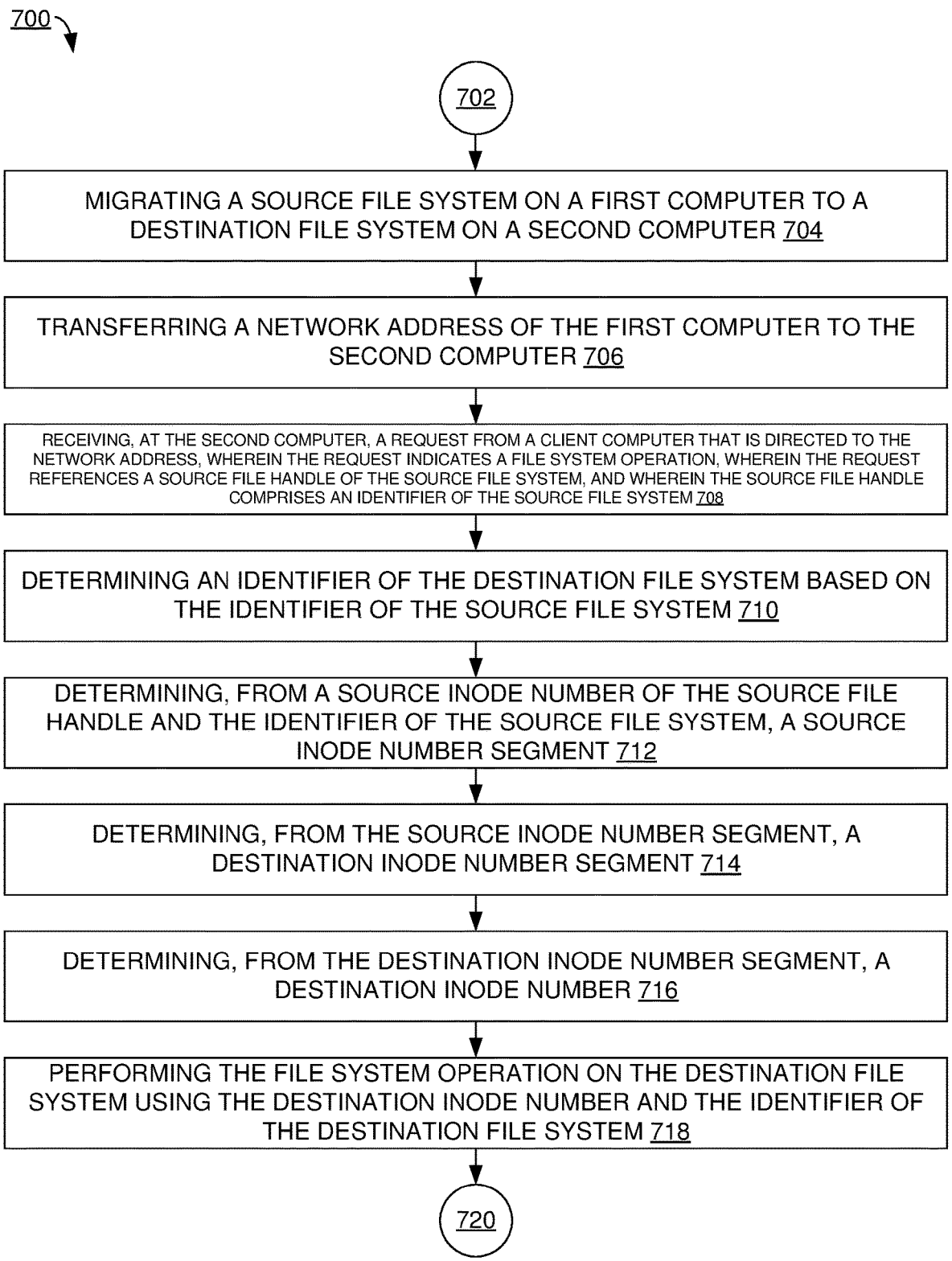
FIG. 7 illustrates another example process flow that can facilitate efficient transparent switchover of file system consolidation migrations, in accordance with an embodiment of this disclosure.

FIG. 7 illustrates an example process flow 700 that can facilitate efficient transparent switchover of file system consolidation migrations, in accordance with an embodiment of this disclosure. In some examples, one or more embodiments of process flow 700 can be implemented by efficient transparent switchover of file system consolidation migrations component 110 of FIG. 1, efficient transparent switchover of file system consolidation migrations component 210 of FIG. 2, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, and/or process flow 900 of FIG. 9.

Process flow 700 begins with 702, and moves to operation 704. Operation 704 depicts migrating a source file system on a first computer to a destination file system on a second computer. That is, a file system migration can occur, such as from source file system 108A of FIG. 1 to destination file system 108B.

After operation 704, process flow 700 moves to operation 706.

Operation 706 depicts transferring a network address of the first computer to the second computer. After a migration occurs, a network address (e.g., an IP address) used to address the source computer can be associated with the destination computer, such that requests to the network address will now be directed to the destination computer.

After operation 706, process flow 700 moves to operation 708.

Operation 708 depicts receiving, at the second computer, a request from a client computer that is directed to the network address, wherein the request indicates a file system operation, wherein the request references a source file handle of the source file system, and wherein the source file handle comprises an identifier of the source file system. That is, a client computer can use a file handle issued by the source file system, where client computer requests are now directed to the destination file system after migration. For instance, client computer 102 of FIG. 1 can use file handle 112.

After operation 708, process flow 700 moves to operation 710.

Operation 710 depicts determining an identifier of the destination file system based on the identifier of the source file system. This can be implemented similar to communications 444-1 and 444-3 of FIG. 4.

After operation 710, process flow 700 moves to operation 712.

Operation 712 depicts determining, from a source inode number of the source file handle and the identifier of the source file system, a source inode number segment. This can be implemented similar to communication 444-2 of FIG. 1.

In some examples, the source inode number segment identifies a range of inode number segments that encompasses the source inode number, and a destination inode number segment. This can be similar to source inode number segment 420 of FIG. 4.

In some examples, operation 712 comprises determining the range of inode number segments based on inode numbers of the source file system. That is, ranges can be selected such that they encompass inode numbers used by the source file system.

In some examples, the source inode number segment is a first source inode number segment that covers a first range of source inode numbers that encompasses the source inode number, operation 712 comprises a second source inode number segment that covers a second range of source inode numbers, wherein the first range of source inode numbers is distinct from the second range of source inode numbers. That is, source inode number segment collection 418 of FIG. 4 can comprise multiple source inode number segments that cover different ranges of inode numbers.

After operation 712, process flow 700 moves to operation 714.

Operation 714 depicts determining, from the source inode number segment, the destination inode number segment. This can be implemented similar to communication 444-4 of FIG. 1.

In some examples, the destination inode number segment identifies a range of inode number segments that encompasses the destination inode number, a migration identifier, and a mapping from the source inode number to the destination inode number. That is, a destination inode number segment can be similar to destination inode number segment 434 of FIG. 4.

In some examples, the destination inode number segment comprises a first destination inode number segment that covers a first range of destination inode numbers that encompasses the destination inode number, and a second destination inode number segment that covers a second range of destination inode numbers, wherein the first range of destination inode numbers is distinct from the second range of destination inode numbers.

After operation 714, process flow 700 moves to operation 716.

Operation 716 depicts determining, from the destination inode number segment, a destination inode number. This can be implemented similar to communication 444-5 of FIG. 1.

After operation 716, process flow 700 moves to operation 718.

Operation 718 depicts performing the file system operation on the destination file system using the destination inode number and the identifier of the destination file system. This can involve, e.g., destination system 106B of FIG. 1 performing a file system operation on destination file system 108B. In some examples, a destination file handle can be created that comprises the destination inode number, the identifier of the destination file system, and a generation number (e.g., similar to destination file handle 402B) of FIG. 4. In other examples, the destination inode number, the identifier of the destination file system (and a generation number) can be used directly to perform the file system operation, without first combining them into a destination file handle.

In some examples, the request is a first request, the file system operation is a first file system operation, the source file system is a first source file system, the source file handle is a first source file handle, the source inode number is a first source inode number, the source inode number segment is a first source inode number segment, the destination inode number segment is a first destination inode number segment, the destination inode number is a first destination inode number, and the destination file handle is a first destination file handle. In such examples, operation 718 can comprise the following operations, which can be similar to that described with respect to system architecture 500 of FIG. 5. Operation 718 can comprise receiving, at the second computer, a second request that indicates a second file system operation, wherein the second request references a second source file handle of a second source file system, and wherein the second source file handle comprises an identifier of the second source file system.

Operation 718 can also comprise determining the identifier of the destination file system based on the identifier of the second source file system. This can be implemented similar to communications 544-1 and 544-3 of FIG. 5.

Operation 718 can also comprise determining, from a second source inode number of the second source file handle, a second source inode number segment. This can be implemented similar to communication 544-2 of FIG. 5.

Operation 718 can also comprise determining, from the second source inode number segment, a second destination inode number segment. This can be implemented similar to communication 544-4 of FIG. 5.

Operation 718 can also comprise performing the second file system operation on the destination file system using the second destination inode number and the identifier of the destination file system. This can involve, e.g., destination system 106B of FIG. 1 preforming a file system operation on destination file system 108B. In some examples, this can be implemented similar to communications 544-5 and 544-6 of FIG. 5, where the resulting destination file handle is used to perform the second file system operation on the destination file system.

After operation 718, process flow 700 moves to 720, where process flow 700 ends.

Figure 8:
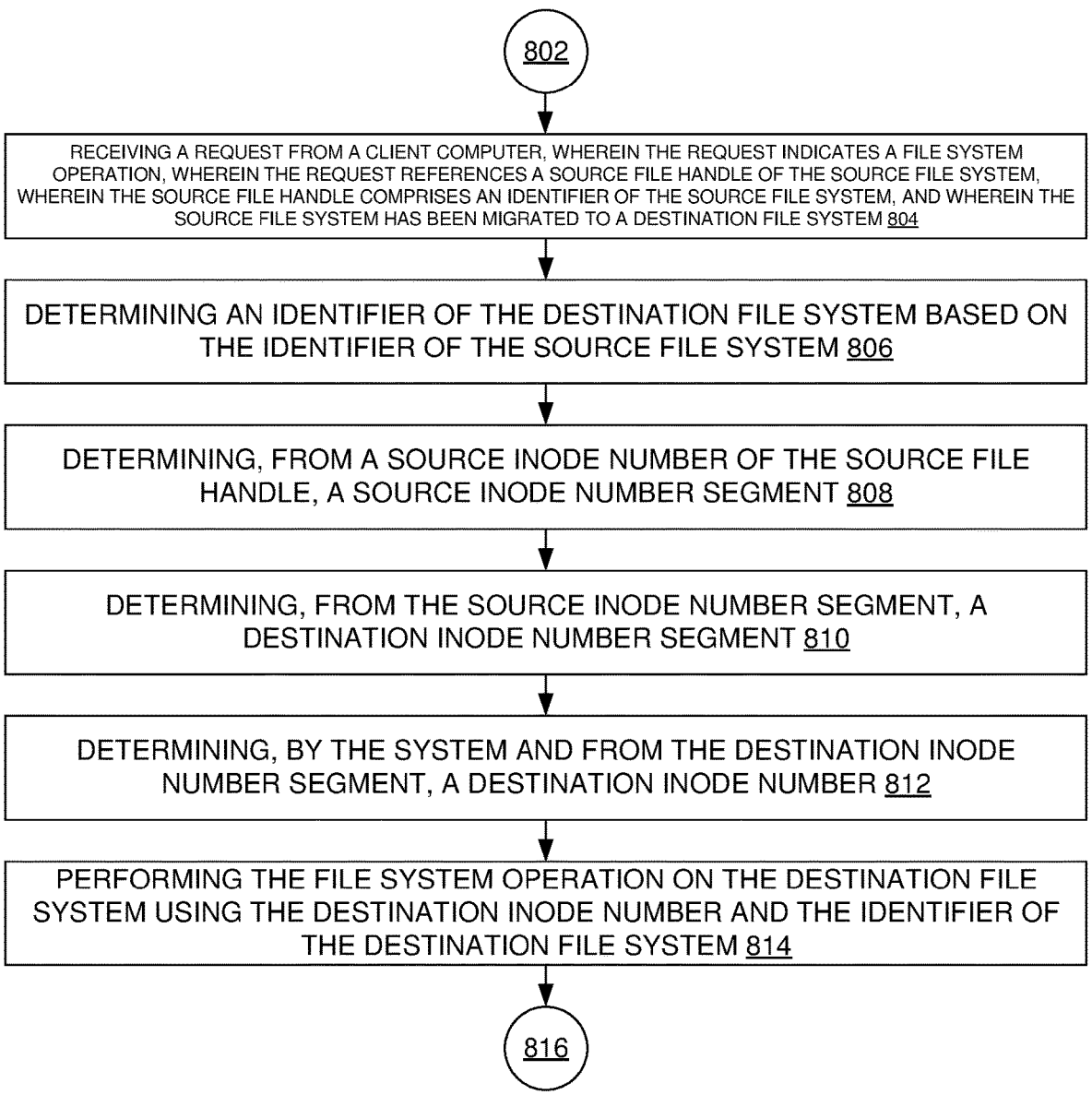
FIG. 8 illustrates another example process flow that can facilitate efficient transparent switchover of file system consolidation migrations, in accordance with an embodiment of this disclosure.

FIG. 8 illustrates another example process flow 800 that can facilitate efficient transparent switchover of file system consolidation migrations, in accordance with an embodiment of this disclosure. In some examples, one or more embodiments of process flow 800 can be implemented by efficient transparent switchover of file system consolidation migrations component 110 of FIG. 1, efficient transparent switchover of file system consolidation migrations component 210 of FIG. 2, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, and/or process flow 900 of FIG. 9.

Process flow 800 begins with 802, and moves to operation 804. Operation 804 depicts receiving a request from a client computer, wherein the request indicates a file system operation, wherein the request references a source file handle of the source file system, wherein the source file handle comprises an identifier of the source file system, and wherein the source file system has been migrated to a destination file system. In some examples, operation 804 can be implemented in a similar manner as operation 708 of FIG. 7.

After operation 804, process flow 800 moves to operation 806.

Operation 806 depicts determining an identifier of the destination file system based on the identifier of the source file system. In some examples, operation 806 can be implemented in a similar manner as operation 710 of FIG. 7.

After operation 806, process flow 800 moves to operation 808.

Operation 808 depicts determining, from a source inode number of the source file handle, a source inode number segment. In some examples, operation 808 can be implemented in a similar manner as operation 710 of FIG. 7.

In some examples, operation 808 comprises, in response to determining that the source file system is configured for being written to, allocating inode numbers to the source inode number segment beyond a range of inode numbers that are present in inodes in the source file system. That is, in some examples, where the source file system is writable, some allowance can be made for allocating additional source inode numbers when initial source inode number segments is determined.

In some examples, operation 808 comprises, in response to determining that the source file system is read-only, determining not to allocate inode numbers to the source inode number segment beyond a range of inode numbers that are present in inodes in the source file system. That is, where the source file system is not writable, then it can be determined that it will not generate new inode numbers, and so determined not to make an allowance for allocating additional source inode numbers.

In some examples, operation 808 comprises maintaining a first migration information that stores an identifier of the first file system, a first identifier of the destination file system, and a first group of source inode number segments that includes the first source inode number segment. That is, the first migration information can be similar to migration info instance A 512A of FIG. 5. In some examples, operation 808 comprises maintaining a second migration information that stores an identifier of the second file system, a second identifier of the destination file system, and a second group of source inode number segments that includes the second source inode number segment. In some examples, the second migration information can be similar to migration info instance B 512B.

In some examples, the source inode number segment is part of a group of source inode number segments, and wherein respective source inode number segments of the group of source inode number segments identify a unique range of inode numbers among the group of source inode number segments and a respective destination inode number segment. That is, the group of source inode number segments can be similar source inode number segment collection 418 of FIG. 4.

After operation 808, process flow 800 moves to operation 810.

Operation 810 depicts determining, from the source inode number segment, a destination inode number segment. In some examples, operation 810 can be implemented in a similar manner as operation 714 of FIG. 7.

After operation 810, process flow 800 moves to operation 812.

Operation 812 depicts determining, from the destination inode number segment, a destination inode number. In some examples, operation 812 can be implemented in a similar manner as operation 716 of FIG. 7.

In some examples, operation 812 comprises determining the destination inode number based on adding a numeric offset to the source inode number or bitwise shifting at least part of the source inode number, wherein the numeric offset or the bitwise shifting is indicated by the destination inode number segment. That is, for example, source inode offset 442 of FIG. 4 can indicate how to convert inode number 406A into inode number+source inode offset 406B, which is usable as part of destination file handle 402B.

After operation 812, process flow 800 moves to operation 814.

Operation 814 depicts performing, by the system, the file system operation on the destination file system using the destination inode number and the identifier of the destination file system. In some examples, operation 814 can be implemented in a similar manner as operation 718 of FIG. 7.

In some examples, the request is a first request, the file system operation is a first file system operation, the source file system is a first source file system, the source file handle is a first source file handle, the source inode number is a first source inode number, the source inode number segment is a first source inode number segment, the destination inode number segment is a first destination inode number segment, the destination inode number is a first destination inode number, and the destination file handle is a first destination file handle. In such examples, operation 814 can comprise receiving, a second request that indicates a second file system operation that references a second source file handle of a second source file system, and wherein the second source file handle comprises an identifier of the second source file system; determining the identifier of the destination file system based on the identifier of the second source file system; determining, from a second source inode number of the second source file handle, a second source inode number segment; determining, from the second source inode number segment, a second destination inode number segment; determining, from the second destination inode number segment, a second destination inode number; and performing the second file system operation on the destination file system using the second destination inode number and the identifier of the destination file system. In such examples, operation 814 can be implemented in a similar manner as operation 718 of FIG. 7.

After operation 814, process flow 800 moves to 816, where process flow 800 ends.

Figure 9:
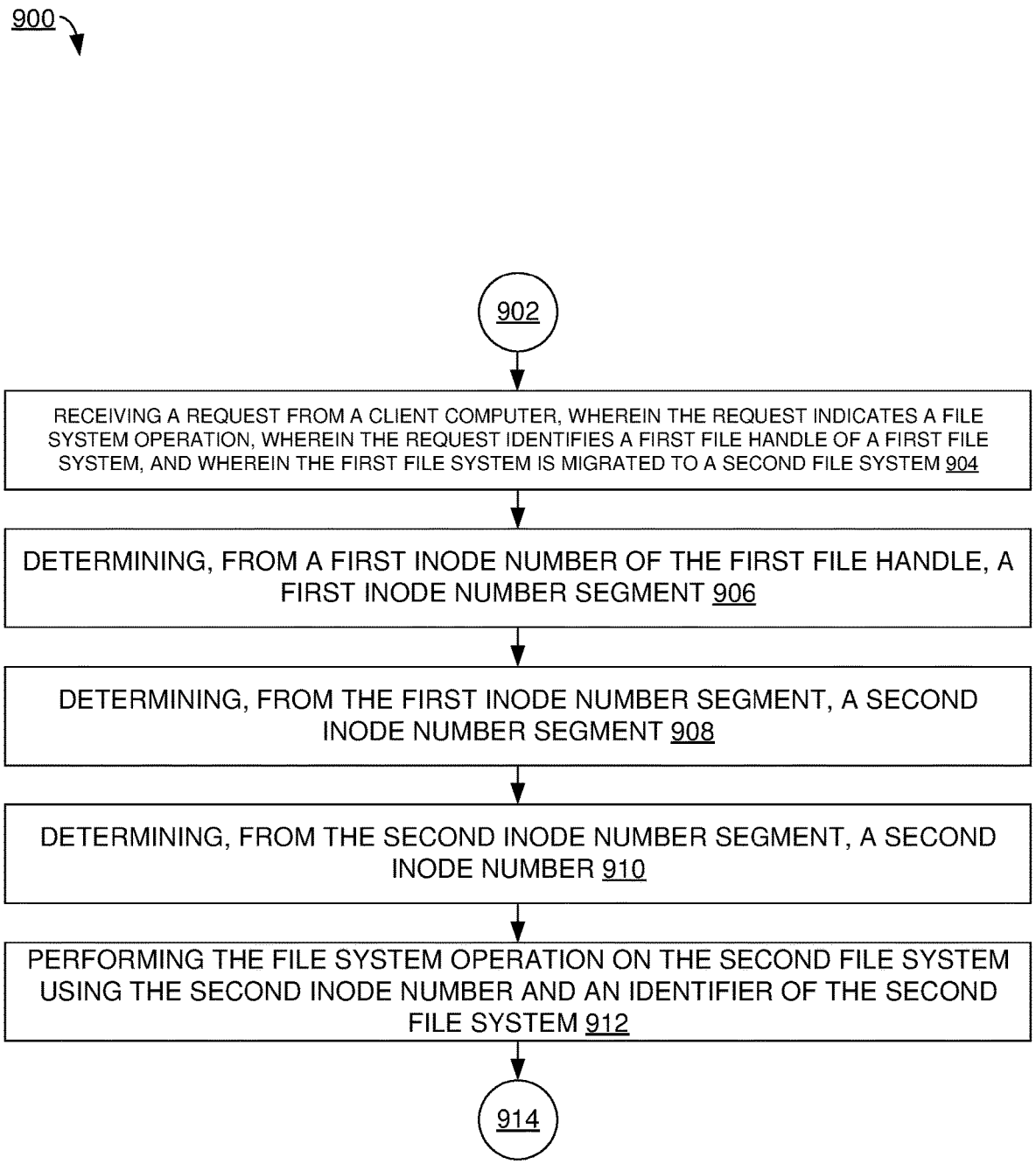
FIG. 9 illustrates another example process flow that can facilitate efficient transparent switchover of file system consolidation migrations, in accordance with an embodiment of this disclosure.

FIG. 9 illustrates another example process flow 900 that can facilitate efficient transparent switchover of file system consolidation migrations, in accordance with an embodiment of this disclosure. In some examples, one or more embodiments of process flow 900 can be implemented by efficient transparent switchover of file system consolidation migrations component 90 of FIG. 1, efficient transparent switchover of file system consolidation migrations component 210 of FIG. 2, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, and/or process flow 800 of FIG. 8.

Process flow 900 begins with 902, and moves to operation 904. Operation 904 depicts receiving a request from a client computer, wherein the request indicates a file system operation, wherein the request identifies a first file handle of a first file system, and wherein the first file system is migrated to a second file system. In some examples, operation 904 can be implemented in a similar manner as operation 708 of FIG. 7.

In some examples, operation 904 comprises, in response to determining, during migration of the first file system to the second file system, that allocating a new inode number at the first file system exceeds a capacity of the first inode number segment, allocating a third inode number segment for the first file system. That is, where during migration, allocating a new inode number on a source file system exceeds a capacity of the source inode number segments, a new source inode segment can be allocated.

In some examples, operation 904 comprises, in response to determining, during migration of the first file system to the second file system, that allocating a new inode number at the second file system exceeds a capacity of the second inode number segment, allocating a third inode number segment for the second file system. That is, where during migration, allocating a new inode number on a destination file system exceeds a capacity of the destination inode number segments, a new destination inode segment can be allocated.

In some examples, the first file handle comprises an identifier of the first file system, the first inode number, and a generation number. That is, the first file handle can be similar to file handle 302 of FIG. 3, where the identifier of the first file system can be similar to file system ID 304, the first inode number can be similar to inode number 306, and the generation number can be similar to generation number 308.

After operation 904, process flow 900 moves to operation 906.

Operation 906 depicts determining, from a first inode number of the first file handle, a first inode number segment. In some examples, operation 906 can be implemented in a similar manner as operation 712 of FIG. 7.

After operation 906, process flow 900 moves to operation 908.

Operation 908 depicts determining, from the first inode number segment, a second inode number segment. In some examples, operation 908 can be implemented in a similar manner as operation 714 of FIG. 7.

After operation 908, process flow 900 moves to operation 910.

Operation 910 depicts determining, from the second inode number segment, a second inode number. In some examples, operation 910 can be implemented in a similar manner as operation 716 of FIG. 7.

After operation 910, process flow 900 moves to operation 912.

Operation 912 depicts performing the file system operation on the second file system using the second inode number and an identifier of the second file system. In some examples, operation 912 can be implemented in a similar manner as operation 718 of FIG. 7.

In some examples, operation 912 comprises translating, based on the second inode number segment, the second inode number to the first inode number. That is, a translation in both directions—from source inode numbers to destination inode numbers, and from destination inode numbers to source inode numbers—can be made.

In some examples, a second file handle used by the second file system comprises an identifier of the second file system, the second inode number, and a generation number. That is, the second file handle can be similar to file handle 302 of FIG. 3. In some examples, the second file system can create a second file handle from the second inode number and an identifier of the second file system, and perform the file system operation in operation 912 using the second file handle.

After operation 912, process flow 900 moves to 914, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102, source system 106A, and/or destination system 106B of FIG. 1; and/or client computer 202, source system 206A, source system 206B, and/or destination system 206C of FIG. 2;

In some examples, computing environment 1000 can implement one or more embodiments of the process flows of FIGS. 6-9 to facilitate efficient transparent switchover of file system consolidation migrations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      migrating a first source file system on a first computer to a first destination file system on a second computer, wherein the second computer hosts a group of migrated file systems that comprises the first destination file system;
      transferring a network address of the first computer to the second computer, wherein, before the transferring, a network communication directed to the network address is directed to the first computer, and wherein, after the transferring, the network communication directed to the network address is directed to the second computer;
      receiving, at the second computer, a request from a client computer that is directed to the network address, wherein the request indicates a file system operation, wherein the request references a source file handle of the first source file system, and wherein the source file handle comprises an identifier of the first source file system;
      determining that the source file handle corresponds to the first destination file system among the group of migrated file systems based on the identifier of the first source file system, wherein the first destination file system comprises an identifier that is unique among the group of migrated file systems;
      determining, from a source inode number of the source file handle and the identifier of the first source file system, a source inode number segment, based on the source inode number being determined to be within a contiguous range of inode numbers associated with the source inode number segment, and wherein the contiguous range of inode numbers is less than a total range of inode numbers of the first source file system;
      determining, from the source inode number segment, a destination inode number segment, wherein the second computer maintains respective destination inode number segments for respective migrated file systems of the group of migrated file systems;
      determining, from the destination inode number segment, a destination inode number; and
      performing the file system operation on the first destination file system of the group of migrated file systems using the destination inode number and the identifier of the first destination file system.

2. The system of claim 1, wherein the request is a first request, wherein the file system operation is a first file system operation, wherein the source file handle is a first source file handle, wherein the source inode number is a first source inode number, wherein the source inode number segment is a first source inode number segment, wherein the destination inode number segment is a first destination inode number segment, wherein the destination inode number is a first destination inode number, wherein the destination file handle is a first destination file handle, and wherein the operations further comprise:
   receiving, at the second computer, a second request that indicates a second file system operation, wherein the second request references a second source file handle of a second source file system, and wherein the second source file handle comprises an identifier of the second source file system;
   determining the identifier of the first destination file system based on the identifier of the second source file system;
   determining, from a second source inode number of the second source file handle, a second source inode number segment;
   determining, from the second source inode number segment, a second destination inode number segment;
   determining, from the second destination inode number segment, a second destination inode number; and
   performing the second file system operation on the first destination file system using the second destination inode number and the identifier of the first destination file system.

3. The system of claim 1, wherein the source inode number segment identifies a range of inode number segments that encompasses the source inode number, and the destination inode number segment.

4. The system of claim 3, wherein the operations further comprise:
   determining the range of inode number segments based on inode numbers of the first source file system.

5. The system of claim 1, wherein the source inode number segment is a first source inode number segment that covers a first range of source inode numbers that encompasses the source inode number, and further comprising:
a second source inode number segment that covers a second range of source inode numbers, wherein the first range of source inode numbers is distinct from the second range of source inode numbers.

6. The system of claim 1, wherein the destination inode number segment identifies a range of inode numbers that encompasses the destination inode number, a migration identifier, and a mapping from the source inode number to the destination inode number.

7. The system of claim 1, wherein the destination inode number segment is a first destination inode number segment that covers a first range of destination inode numbers that encompasses the destination inode number, and further comprising:
a second destination inode number segment that covers a second range of destination inode numbers, wherein the first range of destination inode numbers is distinct from the second range of destination inode numbers.

8. A method, comprising:
receiving, by a system comprising a processor, a request from a client computer, wherein the request indicates a file system operation, wherein the request references a source file handle of a first source file system, wherein the source file handle comprises an identifier of the first source file system, and wherein the first source file system has been migrated to a first destination file system that hosts a group of file systems that comprises the first destination file system;
determining, by the system, that the source file handle corresponds to the first destination file system among the group of migrated file systems based on the identifier of the first source file system, wherein the first destination file system comprises an identifier that is unique among the group of migrated file systems;
determining, by the system and from a source inode number of the source file handle, a source inode number segment, based on the source inode number being determined to be within a contiguous range of inode numbers associated with the source inode number segment, and wherein the contiguous range of inode numbers is less than a total range of inode numbers of the first source file system;
determining, by the system and from the source inode number segment, a destination inode number segment, wherein the second computer maintains respective destination inode number segments for respective migrated file systems of the group of migrated file systems;
determining, by the system and from the destination inode number segment, a destination inode number; and
performing, by the system, the file system operation on the first destination file system of the group of migrated file systems using the destination inode number and the identifier of the first destination file system.

9. The method of claim 8, wherein the request is a first request, wherein the file system operation is a first file system operation, wherein the source file handle is a first source file handle, wherein the source inode number is a first source inode number, wherein the source inode number segment is a first source inode number segment, wherein the destination inode number segment is a first destination inode number segment, wherein the destination inode number is a first destination inode number, wherein the destination file handle is a first destination file handle, and wherein the operations further comprise:

receiving, by the system, a second request that indicates a second file system operation that references a second source file handle of a second source file system, and wherein the second source file handle comprises an identifier of the second source file system;
determining, by the system, the identifier of the first destination file system based on the identifier of the second source file system;
determining, by the system and from a second source inode number of the second source file handle, a second source inode number segment;
determining, by the system and from the second source inode number segment, a second destination inode number segment;
determining, by the system and from the second destination inode number segment, a second destination inode number; and
performing, by the system, the second file system operation on the first destination file system using the second destination inode number and the identifier of the first destination file system.

10. The method of claim 8, further comprising:
maintaining, by the system, a first migration information that stores an identifier of the first file system, a first identifier of the first destination file system, and a first group of source inode number segments that includes the first source inode number segment; and
maintaining, by the system, a second migration information that stores an identifier of the second file system, a second identifier of the first destination file system, and a second group of source inode number segments that includes the second source inode number segment.

11. The method of claim 8, wherein the source inode number segment is part of a group of source inode number segments, and wherein respective source inode number segments of the group of source inode number segments identify a unique range of inode numbers among the group of source inode number segments and a respective destination inode number segment.

12. The method of claim 8, further comprising:
in response to determining, by the system, that the first source file system is configured for being written to, allocating inode numbers to the source inode number segment beyond a range of inode numbers that are present in inodes in the first source file system.

13. The method of claim 8, further comprising:
in response to determining, by the system, that the first source file system is read-only, determining not to allocate inode numbers to the source inode number segment beyond a range of inode numbers that are present in inodes in the first source file system.

14. The method of claim 8, wherein determining, from the destination inode number segment, the destination inode number comprises:
determining the destination inode number based on adding a numeric offset to the source inode number or bitwise shifting at least part of the source inode number, wherein the numeric offset or the bitwise shifting is indicated by the destination inode number segment.

15. A non-transitory computer-readable medium comprising instructions that, in response to execution, cause a system comprising a processor to perform operations, comprising:
receiving a request from a client computer, wherein the request indicates a file system operation, wherein the request identifies a first file handle of a first file system, wherein the first file system is migrated to a second file system on a computer, and wherein the computer hosts a group of migrated file systems;

determining, from a first inode number of the first file handle, a first inode number segment, based on the first inode number being within a contiguous range of inode numbers associated with the first inode number segment;

determining, from the first inode number segment, a second inode number segment wherein the computer maintains respective inode number segments for respective migrated file systems of the group of migrated file systems;

determining, from the second inode number segment, a second inode number; and performing the file system operation on the second file system using the second inode number and an identifier of the second file system.

16. The non-transitory computer-readable medium of claim 15, wherein the operations further comprise:
in response to determining, during migration of the first file system to the second file system, that allocating a new inode number at the first file system exceeds a capacity of the first inode number segment, allocating a third inode number segment for the first file system.

17. The non-transitory computer-readable medium of claim 15, wherein the operations further comprise:
in response to determining, during migration of the first file system to the second file system, that allocating a new inode number at the second file system exceeds a capacity of the second inode number segment, allocating a third inode number segment for the second file system.

18. The non-transitory computer-readable medium of claim 15, wherein the operations further comprise:
translating, based on the second inode number segment, the second inode number to the first inode number.

19. The non-transitory computer-readable medium of claim 15, wherein the first file handle comprises an identifier of the first file system, the first inode number, and a generation number.

20. The non-transitory computer-readable medium of claim 15, wherein a second file handle used by the second file system comprises an identifier of the second file system, the second inode number, and a generation number.

* * * * *